US009882895B2

(12) United States Patent
Woodward et al.

(10) Patent No.: US 9,882,895 B2
(45) Date of Patent: *Jan. 30, 2018

(54) AUTO-USER REGISTRATION AND UNLOCKING OF A COMPUTING DEVICE

(71) Applicant: Google Inc., Mountain View, CA (US)

(72) Inventors: Joshua Woodward, Mountain View, CA (US); Jay Pierre Civelli, Sunnyvale, CA (US); Dirk Balfanz, Redwood City, CA (US); Marco Fucci, San Francisco, CA (US); Alexei Czeskis, San Jose, CA (US); Nishit Shah, Fremont, CA (US); Kan Liu, Mountain View, CA (US); Michal Levin, Palo Alto, CA (US)

(73) Assignee: Google LLC, Mountain View, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 14/989,757

(22) Filed: Jan. 6, 2016

(65) Prior Publication Data
US 2016/0119322 A1    Apr. 28, 2016

Related U.S. Application Data

(63) Continuation of application No. 14/609,407, filed on Jan. 29, 2015, now Pat. No. 9,276,914.
(Continued)

(51) Int. Cl.
H04L 9/32     (2006.01)
H04L 29/06   (2006.01)
(Continued)

(52) U.S. Cl.
CPC ........ *H04L 63/083* (2013.01); *H04L 63/0428* (2013.01); *H04L 63/061* (2013.01);
(Continued)

(58) Field of Classification Search
None
See application file for complete search history.

(56) References Cited

U.S. PATENT DOCUMENTS 7,970,911 B2   6/2011   Blatherwick et al.
8,112,066 B2   2/2012   Ben Ayed
(Continued)

FOREIGN PATENT DOCUMENTS

KR   10-2005-0083042   8/2005
KR   10-2012-0120021   11/2012

OTHER PUBLICATIONS

A. Dachis, "How to Automatically Unlock Your Gadgets Without a Password", Lifehacker, Jun. 3, 2013, pp. 1-11, <http://lifehacker.com/how-to-make-your-smartphone-automatically-unlock-your-s-510592193>.

(Continued)

Primary Examiner — David Le
(74) Attorney, Agent, or Firm — McDermott Will & Emery LLP

(57) ABSTRACT

A first computing device provides an indication that the first computing device accepts dynamic user registration of user accounts over a wireless connection. A second computing device automatically connects to the first computing device and passes an account token to the first computing device over the wireless connection, all without physical interaction with the first computing device. The first computing device automatically contacts a remote account server to retrieve a user account associated with the account token and registers the user account with the first computing device.

20 Claims, 8 Drawing Sheets

Related U.S. Application Data

(60) Provisional application No. 61/980,013, filed on Apr. 15, 2014.

(51) Int. Cl.
  *H04W 12/06* (2009.01)
  *H04W 12/04* (2009.01)
  *H04W 12/08* (2009.01)

(52) U.S. Cl.
  CPC .......... *H04W 12/04* (2013.01); *H04W 12/06* (2013.01); *H04W 12/08* (2013.01)

(56) References Cited

U.S. PATENT DOCUMENTS

| | | |
|---|---|---|
| 8,396,452 B1 | 3/2013 | Matsuoka |
| 8,457,692 B2 | 6/2013 | Fyke et al. |
| 2002/0061748 A1 | 5/2002 | Nakakita et al. |
| 2008/0070503 A1 | 3/2008 | Bang |
| 2008/0229406 A1 | 9/2008 | Go |
| 2009/0117883 A1 | 5/2009 | Coffing et al. |
| 2011/0225426 A1 | 9/2011 | Agarwal et al. |
| 2011/0302630 A1 | 12/2011 | Nair et al. |
| 2013/0086232 A1 | 4/2013 | Hwang et al. |
| 2013/0103946 A1 | 4/2013 | Binenstock |
| 2013/0205136 A1 | 8/2013 | Kirsch |
| 2013/0308778 A1 | 11/2013 | Fosmark et al. |
| 2014/0354399 A1 | 12/2014 | Allen et al. |

OTHER PUBLICATIONS

A. Pash, "Automate Proximity and Location-Based Computer Actions", Lifehacker, Jun. 5, 2007, pp. 1-6, <http://lifehacker.com/265822/automate-proximity-and-location-based- computer-actions>.

"iOS: About Guided Access", Apple Support, last modified Nov. 27, 2014, pp. 1-2, <http://support.apple.com/en-us/HT202612>.

Australian Examination Report from Australian Patent Application No. 2015247838, dated Sep. 1, 2017, 6 pages.

Extended European Search Report from European Patent Application No. 15780024.4, dated Oct. 27, 2017, 7 pages.

us 9,882,895 B2

AUTO-USER REGISTRATION AND UNLOCKING OF A COMPUTING DEVICE

CROSS-REFERENCE TO RELATED APPLICATIONS

The present application claims the benefit of priority under 35 U.S.C. § 120 as a continuation of U.S. patent application Ser. No. 14/609,407 entitled "Auto-User Registration and Unlocking of a Computing Device," filed on Jan. 29, 2015, which claims the benefit of priority under 35 U.S.C. § 119 from U.S. Provisional Patent Application Ser. No. 61/980,013 entitled "Auto-User Registration and Unlocking of a Computing Device," filed on Apr. 15, 2014, the disclosures of which are hereby incorporated by reference in their entirety for all purposes.

BACKGROUND

A computing device may be locked in response to a keystroke or after a certain time period in which the device has been inactive. The computing device may, for example, display a security screen which prompts a user to enter a passcode or provide one or more security credentials before the device is unlocked. On entry of the passcode, the computer is unlocked and access to the computing device and data and programs stored thereon are made available.

SUMMARY

The subject technology provides a system and computer-implemented method for registration of a new user account on a computing device. In various aspects, the method may include providing, by a first computing device, an indication that the first computing device accepts user registration of user accounts over a wireless connection, after or in connection with providing the indication, receiving a request to initiate the user registration from a second computing device over the wireless connection, establishing an encrypted connection between the first computing device and the second computing device in response to the request, receiving, over the encrypted connection, an account token for obtaining user account information associated with a user account on the second computing device, obtaining, based on the account token, the user account information from a server, and registering the user account with the first computing device based on the obtained user account information in response to obtaining the user account information. Other aspects include corresponding systems, apparatuses, and computer program products for implementation of the computer-implemented method.

In various aspects, a computer program product tangibly embodied in a computer-readable storage device comprises instructions that, when executed by a computing device, cause a computing device to broadcast an ability to accept user registration of user accounts over a wireless connection, receive, after or in connection with the broadcasting, an initiation of the user registration from a second computing device over the wireless connection, receive, over the wireless connection, an account token associated with a user account, obtain, from a server, user account information for the user account based on the account token, and register the user account with the first computing device in response to obtaining the user account information. Other aspects include corresponding systems, apparatuses, and computer program products for implementation of the machine-readable medium.

In further aspects, a system may include one or more processors and a memory. The memory may include instructions that, when executed by the one or more processors, cause the one or more processors to facilitate the steps of indicating a first computing device accepts user registration of user accounts over a wireless connection, receiving, after or in connection with the broadcasting, an initiation of the user registration from a second computing device over the wireless connection, receiving, over the wireless connection, an encrypted account token associated with a user account, decrypting the account token, obtaining, from a server, user account information for the user account based on the decrypted account token, registering the user account with the first computing device in response to obtaining the user account information, and automatically authorizing use of the computing device based on the user account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
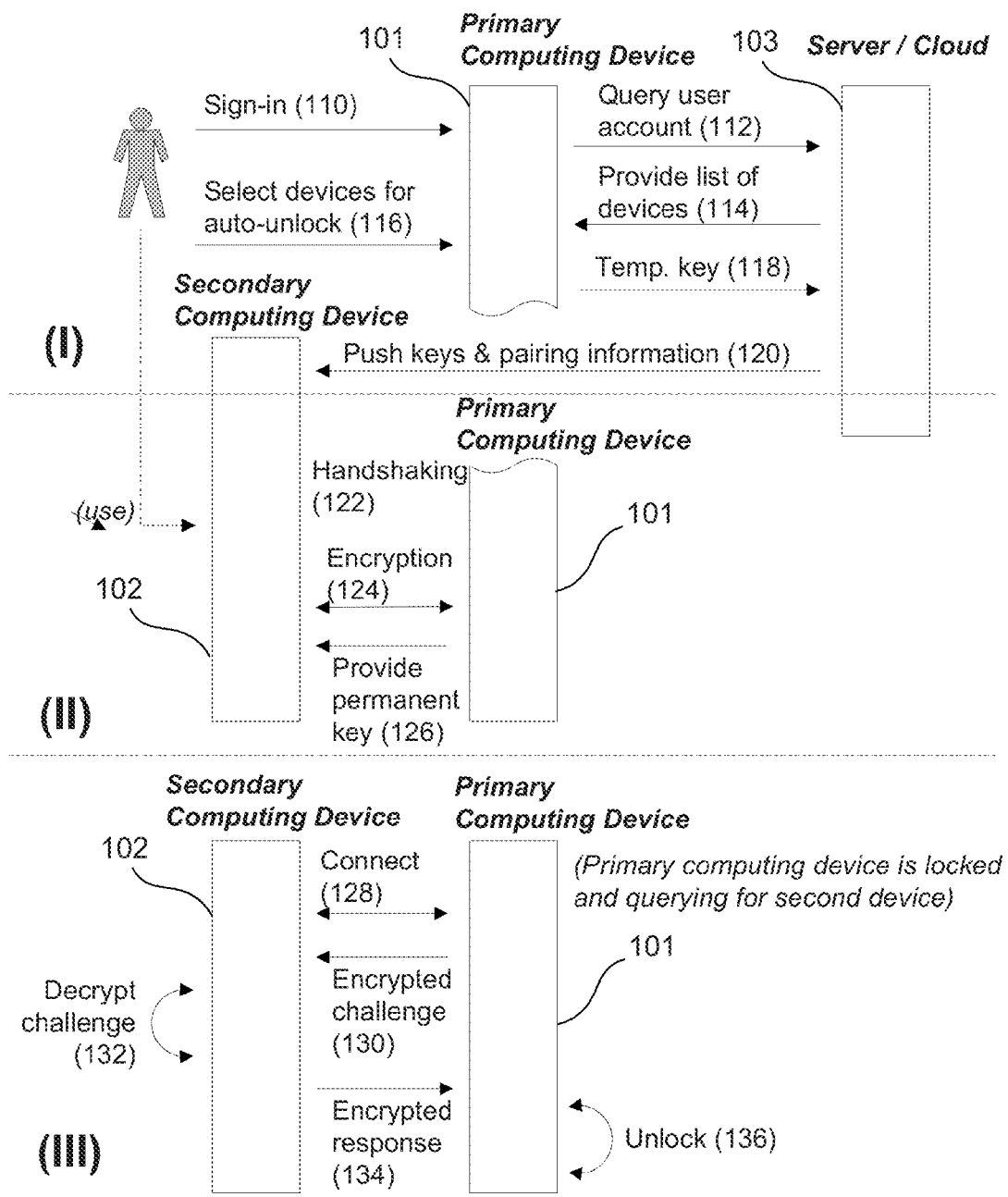
FIG. 1 depicts example data flows through a system for unlocking or locking a primary computing device based on proximity of a second computing device.

The subject technology provides various mechanisms to automatically register a user account with a computing device over a wireless connection without any physical interaction with the device, and to lock and unlock a computing device based on the user's proximity to the device. When the computing device is locked based on proximity of the user according to aspects of the subject technology, the device may automatically be configured to allow continued operation of selected applications and/or features while preventing use of other applications.

In various aspects, a primary computing device is operably connected to and/or paired with a secondary computing device via Bluetooth or other wireless technology. The primary computing device may be, for example, a laptop or desktop computer, and the secondary device may be, for example, a smart phone or other mobile device. The devices are configured such that, when the user's secondary computing device approaches or moves a predetermined distance away from the primary computing device, the primary computing device is automatically unlocked or locked. Unlocking or locking the device may include, for example, deactivating or activating a security screen displayed on the device. The primary computing device may be locked and unlocked based on the devices being within a threshold distance of each other. For example, a distance between the devices may be determined based on one or more proximity sensors of the primary computing device, signal strength of a Bluetooth or other wireless connection between the mobile device and the computing device, data throughput, and the like.

In some instances, the secondary computing device may be configured to unlock or lock the primary computing device during registration of a user account on the primary (or secondary) device. User account profiles are generally stored in an account server, for example, on a data cloud. When configuring the primary computing device, the primary computing device may be authorized to access the account server to retrieve account information based on one or more credentials. For example, a user may sign-in to the primary computing device using an email address and password, and the device may use the sign-in information to download the user's account information from the account server and configure the account information on the device. The primary computing device may then determine that the user's account is associated with the secondary computing device. The computing device may prompt the user as to whether the user would like to use the secondary computing device to unlock and lock the primary computing device (e.g., a laptop may ask "would you like to us this phone to unlock this laptop?"). If the user answers "yes" then the computing device may initiate an exchange of keys with the mobile device for use in unlocking or locking the computing device.

In various aspects, the primary computing device (e.g., a laptop) is configured to allow dynamic registration of a user account on the device using an unknown secondary computing device over a wireless connection, without any manual authentication to or physical interaction with the primary computing device. In this regard, the primary computing device is configured to advertise an ability to accept dynamic login and/or registration from other devices over a wireless connection (e.g., a WiFi or Bluetooth Low Energy connection). The primary computing device is operably connected to the account server over a first network, for example over the Internet, and the secondary computing device is operably connected to the account server over a second network, for example, over a mobile network. The secondary computing device is also configured to recognize signals from the primary computing device over the wireless connection, which designate the primary computing device as having the ability to accept dynamic registration.

When the secondary computing device discovers that the primary computing device accepts dynamic registration, the secondary computing device may initiate a connection with the primary computing device to receive information about the primary computing device. The secondary computing device then informs its user that the primary computing device is nearby and/or that the primary computing device accepts dynamic registration. The user may then initiate the registration process at the secondary computing device, without any physical interaction with the primary computing device. An encrypted connection between the computing devices may then be automatically established, and a request to register the user sent to the primary computing device over the wireless connection.

The subject technology also provides a mechanism for locking the primary computing device into an existing operational state when it is inferred that the user is no longer actively using the primary device. This might occur, for example, if the user of the primary computing device moves away. The primary computing device remembers the wireless signature of the secondary computing device (e.g., a Bluetooth address of a mobile device) when the devices are communicate or otherwise paired to each other. When the primary computing device detects that the secondary computing device is no longer present or has moved out of an area proximate to the primary computing device (based on, for example, sensing the mobile device or strength of a pairing signal), the primary computing device automatically enters into a locked mode by which certain interactive features of the computing device remain active to allow current operation of one or more presently executing applications. When the secondary computing device is later recognized as being proximate to the primary computing device, the primary computing device may signal the secondary computing device, asking whether the secondary computing device wishes to unlock all remaining features of the computing device, and the secondary computing device may automatically confirm unlocking of the remaining features.

FIG. 1 depicts example data flows through a system 100 for unlocking or locking a primary computing device 101 based on proximity of a second computing device 102 according to various aspects of the subject technology. Each of the primary and second computing devices referred to throughout this disclosure may be, for example, a smart phone, personal computer, tablet or notebook computer, personal data assistant, augmented-reality glasses, or a television or other display device with one or more computing devices embedded therein or attached thereto. Primary computing device 101 may be referred to as a "first" computing device, and secondary computing device 102 may be referred to as a "second" computing device. For the purpose of this disclosure and the various implementations described herein either device may be configured and/or used to unlock or lock the other device. In various examples, a primary computing device is a laptop or personal computer located at a fixed location, and a secondary device is a mobile device such as a smart phone or augmented-reality glasses.

Primary computing device 101 and secondary computing device 102, in various implementations, are tied to a user account. Accordingly, a user is authorized to use the device by authenticating to the user account. The user account may be a universal account for multiple devices. In this regard, information stored in connection with the user account may be centrally located on a third computing device, for example, on a server 103 (e.g., in a "data cloud"). Accordingly, when data is received, input, or stored on either primary computing device 101 or secondary computing device 102 the data may be automatically replicated or co-located to the centrally located user account on server 103. Similarly, when the centrally located user account is updated the updated data may be synchronized with all operably connected and/or configured "account-linked" devices, including primary computing device 101 and secondary computing device 102.

In some aspects, each account-linked device may securely store (e.g., using encryption) a universal credential token (e.g., an OPENID or OAUTH token) for accessing the centrally located user account (e.g., without use of the primary credentials attached to the account, for example a username and password pair). An account-linked device (e.g., primary computing device 101 or secondary computing device 102) may prompt a user for input of the primary credentials upon a configuration of the device, authenticate to the centrally located user account on server 103 using the primary credentials, and receive in response the universal credential token for subsequent authorizations. In this manner, the account-linked device may repeatedly access account-related server resources on behalf of the account owner without having to pass the primary credential information over a network. Security implementations for authentication and/or authorization may include, for example, OPENID or OATH Authentication schemes.

The upper portion of FIG. 1 (I) depicts example data flows for associating one or more devices with primary computing device 101. In the depicted example, primary computing device 101 and secondary computing 103 device are account-linked devices that are connected to a user account stored at server 103. In this regard, server 103 may store, in connection with the user account, information about each account-linked device. When a user signs in to (110) (e.g., authenticates to) primary computing device 101 and/or a user account associate with the device (e.g., using any credentials for the device, including the primary credentials for the user account), primary computing device may send a query (112) to server 103 to ask the server whether there are any other account-linked devices associated with the user account. Server 103 may respond by indicating there are one or more devices linked to the user account and provides (114) one or more or all of them to primary computing device 101 for selection by the user.

On selection (116) of one or more of the account-linked devices indicated by server 103, primary computing device 101 may send information about itself to server 103 to be stored in connection with the user account and/or forwarded to the selected device(s) for use in unlocking or locking primary computing device 101. In the depicted example, primary computing device 101 generates and sends (118) a temporary (e.g., cryptographic) key to server 103 to be sent along to secondary computing device 102, which was previously selected by the user. Server 103 then provides (120) the temporary access key to secondary computing device 102. For example, server 103 may automatically push the temporary access key to secondary computing device 102 over a network, or secondary computing device 102 may retrieve the temporary access key the next time the devices are connected. In some aspects, primary computing device 101 may also provide a primary wireless signature for itself and/or other pairing information, and the primary wireless signature and/or pairing information may be provided to secondary computing device 102 with the temporary access key. The primary wireless signature may be, for example, a Bluetooth hardware address, MAC address, basic service set identification (BSSID), International Mobile Subscriber Identity (IMSI) stored in the subscriber identity module (SIM), Mobile Subscriber ISDN Number (MSISDN) assigned to a SIM, Electronic Serial Number (ESN), Mobile Equipment Identifier (MEID), or any other address usable for identifying primary computing device 102 over a wireless connection.

It is understood that, upon user consent, identification and/or selection of computing devices linked to an account associated with the user may be accomplished without authenticating to primary computing device 101. For example, the user may authenticate to a centrally-located user account by directly accessing server 103, for example, from a web browser on a terminal computer or other non-account linked computing device. In this regard, server 103 may have previously received temporary access keys and/or wireless signatures from account-linked devices, for example, during a registration of the devices or in connection with an authenticated session or communication exchange between the server and a respective device. In some implementations, server 103 may generate and provide the temporary access key to a device identified as being linked to the user account. In an example implementation, server 103 may also provide cloud-assisted pairing for all devices known to be used by the user. For example, the user may register with one device (e.g., primary computing device 101 or secondary computing device 102) and provide consent for the account server to associate other devices linked to the user's account. In this regard, the account server may push pairing information to all devices associated with the user's account. The pairing information may include, for example, one or more wireless signatures for each device to be paired in addition to any information to facilitate pairing of the devices. Proof of the user's identity (e.g., a secret shared among multiple devices or a certificate) may also be provided to the devices.

The middle portion of FIG. 1 (II) depicts a configuration of secondary computing device 102 to automatically unlock primary computing device 101. Once secondary computing device 102 receives the temporary access key and/or wireless signature of primary computing device 101, secondary computing device 102 configures itself to automatically connect to computing device 101 over a wireless connection. Software installed on secondary computing device 102 is configured to (e.g., when authorized by the user) monitor an area surrounding the device for a wireless signal of primary computing device 101, for example, by recognizing the previously received wireless signature of primary computing device 101. The monitored area may span the range of the wireless hardware (e.g., in which a reliable Bluetooth signal may be acquired) or a predetermined area (e.g., based on a predetermined signal strength). Additionally or in the alternative, software operating on primary computing device 101 may broadcast, over a wireless access point, a code which when interpreted by corresponding software on secondary computing device 102, identifies primary computing device 101 as a computing device configured to allow users with a particular type of user account to sign in to or be registered.

Once primary computing device 101 is detected (and the ability to dynamically sign in to the device), the software on secondary computing device 102 initiates a handshaking (122) using the temporary access key. During the handshaking processes, an encrypted connection is established (124) between primary computing device 101 and secondary computing device 102. Primary computing device 101 may then provide (126) secondary computing device 102 a permanent access key for use in subsequent connection requests to primary computing device 101. Permanent access key may be a cryptographic key (e.g., a certificate or private key) for use in decrypting messages sent by primary computing device 101. Secondary computing device 102 stores the permanent access key in a secured location on the device.

The lower portion of FIG. 1 (III) depicts example data flows for automatically unlocking and locking primary computing device 101 based on proximity of secondary computing device 102. Primary computing device 101 stores the wireless signature of the secondary computing device 102 and the permanent access key provided to secondary computing device 102. Software on primary computing device 101 (e.g., when authorized by the user) configures primary computing device 101, on entering a locked mode (e.g., when locked manually or after a period of inactivity), to begin monitoring a wireless access point of primary computing device 101 for the wireless signature of secondary computing device 102 to determine if secondary computing device 102 is present.

When in the locked mode, primary computing device 101 monitors and, in the depicted example, identifies and establishes a connection (128) with secondary computing device 102 while in the locked mode. The connection may be established based on pairing information previously shared between the devices. Identification of secondary computing device 102 (based on the stored wireless signature) may occur before or in connection with pairing of the devices. For example, primary computing device 101 may detect the wireless signature and then automatically initiate pairing in response to the signature, or software may monitor a paired device list associated with the wireless hardware of primary computing device 101 for the wireless signature of secondary computing device 102. Similarly, when already paired, primary computing device 101 may identify secondary computing device as becoming unpaired or moving out of range of the wireless access point (e.g., based on signal strength or data throughput), and automatically enter into a locked mode.

When primary computing device 101 is in the locked mode, and secondary computing device 102 is recognized as being proximate to primary computing device 101 (e.g., in the paired device list), primary computing device 101 may send (130) an encrypted challenge message to secondary computing device 102, asking whether secondary computing device 102 wishes to unlock primary computing device 101. Because the devices have previously information and secondary computing device 102 has the permanent access key previously provided by primary computing device, secondary computing device 102 decrypts (132) the challenge message, for example, to extract a challenge code within the message. Secondary computing device 102 may then automatically assert the unlocking of primary computing device 101 merely by encrypting a response code with the permanent access key and providing (134) the encrypted response message to primary computing device 101. Software on primary computing device 101 waits for the response and, on receiving the response message which validates that secondary computing device 102 is authorized to unlock primary computing device 101, unlocks (136) primary computing device 101, for example, by inactivating a security screen on the device. In some aspects, secondary computing device 102 may prompt the user before providing the response message to primary computing device 101 to complete the unlocking transaction. When primary computing device 101 detects that secondary computing device 102 is no longer present or has moved a distance away, primary computing device 101 may automatically enter into the locked mode.

While the foregoing example depicts secondary computing device 102 providing an unlocking of primary computing device 101, it is understood that the roles may be reversed such that primary computing device 101 may be used to unlock secondary computing device 102. In an example wherein secondary computing device 102 is a mobile device with its screen locked, the mobile device may be automatically unlocked upon moving within a predetermined range or distance from primary computing device 101.

Figure 2:
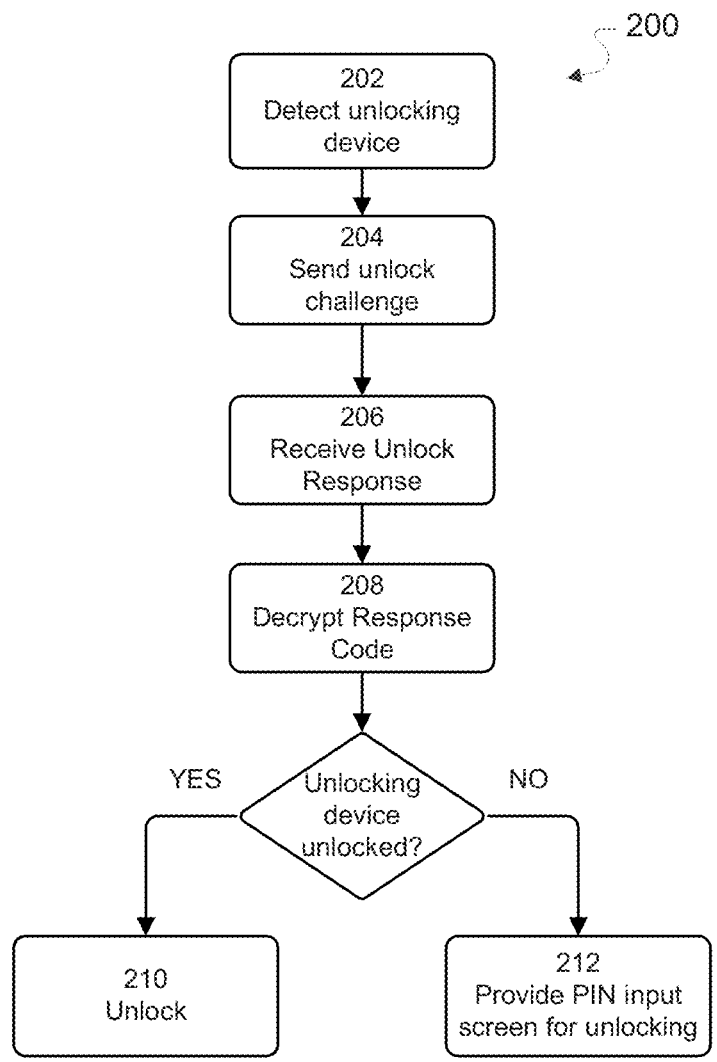
FIG. 2 illustrates a flow diagram of an example process for unlocking a computing device.

FIG. 2 illustrates a flow diagram of an example process 200 for unlocking a computing device in accordance with various aspects of the subject technology. For explanatory purposes, example process 200 is described herein with reference to the data flow depicted in the lower portion of FIG. 1 (III), however, example process 200 may also be applicable to other portions of FIG. 1 or other component data flows and process described herein. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

As described previously, primary computing device 101 may be configured to detect a previously paired or otherwise registered "unlocking device" when primary computing device 101 is in the locked mode. In the depicted example process 200, primary computing device 101 is in the locked mode. In this regard, primary computing device 101 may display a security access screen which prevents use or viewing of programs currently active on primary computing device 101. Accordingly, when in the locked mode, primary computing device 101 detects secondary computing device 102 as being a previously registered unlocking device (202). In response to detecting secondary computing device 102, primary computing device 101 sends an encrypted challenge message to secondary computing device 102 (204), asking whether secondary computing device 102 wishes to unlock primary computing device 101.

Secondary computing device 102 responds to the challenge by sending an encrypted challenge response code. The encrypted challenge response code is encrypted using a permanent access key which was previously provided by primary computing device 101, and which primary computing device 101 will recognize as being previously sent by primary computing device 101. Primary computing device 101 receives the encrypted challenge response (206) and, on receiving the response message, primary computing device 102 decrypts the message (208) and retrieves the unencrypted challenge response code.

By virtue of being able to decrypt the encrypted response code with the stored primary access key, primary computing device 101 validates secondary computing device 102 as an unlocking device, however primary computing device 101 may take one or multiple actions depending on what indication(s) the code provides. In some implementations, the challenge response code indicates whether secondary computing device 102 (the device sending the code) is itself locked. In this manner, primary computing device may not immediately unlock itself if the secondary computing device is locked. In the depicted example, if the code indicates that secondary computing device 102 is unlocked then primary computing device unlocks (210) as described above with respect to FIG. 1. However, if the code indicates that secondary computing device 102 is locked (e.g., displaying a security screen) then primary computing device 101 displays a limited credential input for unlocking primary computing device 101 (212). For example, primary computing device 101 may display an input for entering a multiple digit (e.g., 4 digit) PIN (personal identification number). Upon receiving the correct PIN at the input, primary computing device 101 unlocks (e.g., removes the security access screen).

Figure 3:
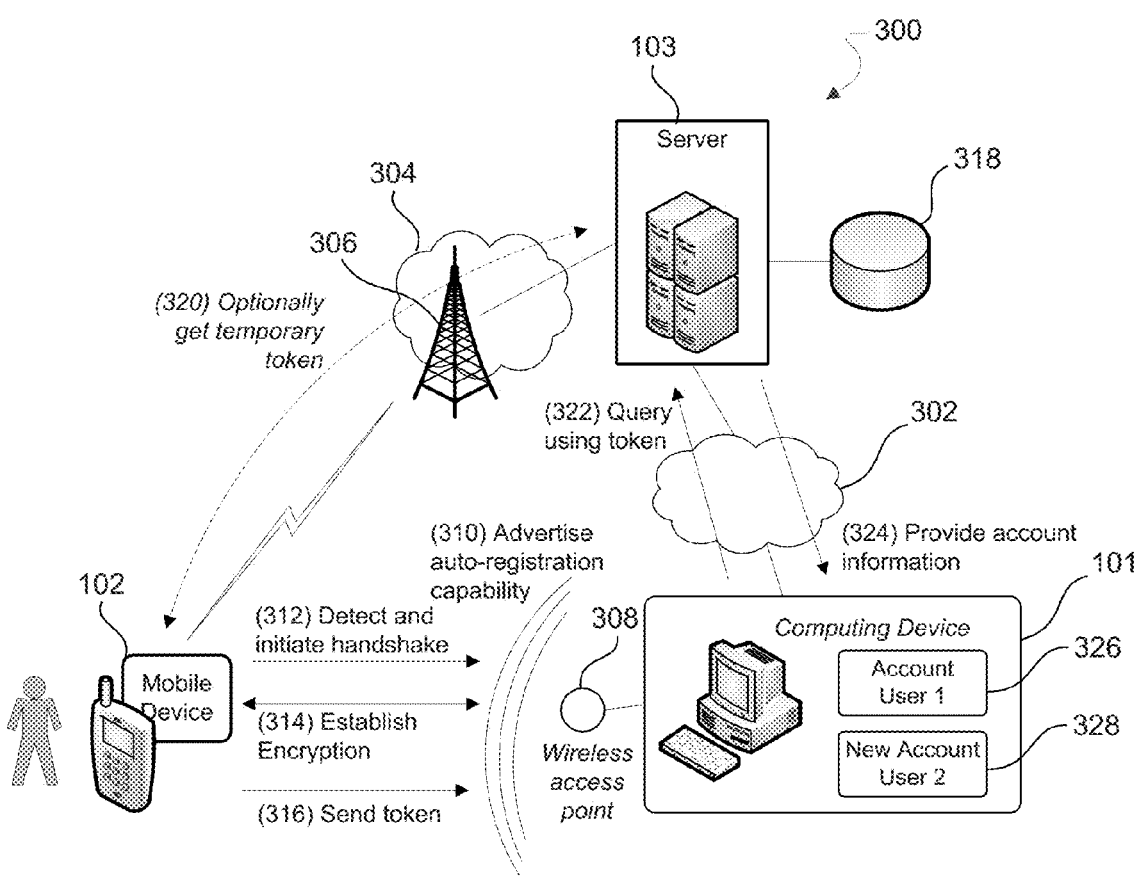
FIG. 3 depicts example data flows through a system for dynamic registration of a new user account on a computing device.

FIG. 3 depicts example data flows through a system 300 for dynamic registration of a new user account on a computing device. System 300 is representative of one or more of multiple configurations of primary computing device 101, secondary computing device 102, and server 103. Accordingly, the capabilities and processes depicted or represented by FIG. 3 are compatible and interchangeable with the capabilities and processes of FIGS. 1 and 2.

In the depicted example, a primary computing device 101 and secondary computing device 102 are operably connected to server 103 over one or more networks. For example, primary computing device 101 may be connected to server 103 by network 302. Network 302 may be a WAN, LAN, or any other network consisting of one or multiple networking technologies (such as satellite, cellular, cable, DSL, optical network, Ethernet over twisted pairs, and others), and which deploys one or multiple networking protocols for transferring data. Network 302 may also include, but is not limited to, any one or more of the following network topologies, including a bus network, a star network, a ring network, a mesh network, a star-bus network, a tree or hierarchical network, and the like. Network 302 may also be a wireless personal area network (e.g., Bluetooth, Bluetooth Low Energy, infrared, IrDA, Wireless USB, and the like).

Similarly, secondary computing device 102 may also be connected to server 103 over network 302, or may be connected to a different network or combination of networks. As depicted in FIG. 3, secondary computing device 102 may be operably connected to server 103 by a mobile network 304. Mobile network 304 may be operably connected to network 302 such that data received from secondary computing device 102 is transmitted to network 302 via mobile network 304 and then transmitted to server 103 using network 302. Mobile network 304 may include one or more wireless stations 306 for wirelessly communicating with secondary computing device 102 or other similarly situated devices. A wireless station 306 may be, for example, a local WiFi base station, wireless personal area network, or, in some aspects, a cell site (including a cell tower or antennae, or radio receiver/transmitter).

In some implementations, system 300, primary computing device 101, secondary computing device 102, server 103, and/or other components of system 300 may be connected via a network to an online community product (e.g., a social network). Accordingly, one or more communications described herein (e.g., encrypted messages) may be transmitted via the online community product or services associated with the product. The various computing devices may also be connected to and/or communicate with each other via the Internet, or a private LAN/WAN. Any of the various connections may be made over a wired or wireless connection.

Primary computing device 101 is configured with wireless access point 308 (e.g., Bluetooth or Bluetooth Low Energy hardware) for establishing a wireless connection with the device over a personal area network. Using wireless access point 308, primary computing device 101 is configured to broadcast (e.g., electronically advertise or transmit) an ability to accept dynamic user registration of a user account over the wireless connection (310). For example, software operating on primary computing device may broadcast, over wireless access point 308, a code which when interpreted by corresponding software on a receiving device identifies primary computing device 101 as a computing device configured to allow users with a particular type of user account to sign in to or be registered. In various implementations, primary computing device 101 may broadcast the code together with a public key for establishing an encrypted connection.

Secondary computing device 102 is configured to, in response to detecting the ability of primary computing device 101 to accept dynamic registration, initiate handshaking (312) with primary computing device 101 to establish a wireless connection and initiate dynamic registration of a user account associated with secondary computing device 102 on primary computing device 101. In some aspects, secondary computing device 102 may be configured to send a request (including, e.g., a request code) to primary computing device 102, in connection with the handshaking, indicating a request initiate the dynamic user registration from secondary computing device over the established wireless connection. Both devices are configured to establish an encrypted connection (314) using, for example, the public key shared by primary device 101. In various aspects, the encrypted connection may be established in response to secondary computing device providing the request code to primary computing device 101.

Once the encrypted connection has been established, secondary computing device is configured (e.g., with software) to send over the encrypted connection an account token (316) for obtaining a centrally located user account associated with secondary computing device 102. In some implementations, the account token may be a universal credential token (e.g., an OPENID or OAUTH token) tied to the user account stored at server 103, for example, at least partially in a database 318. In some implementations, the account token may be a temporary token for use in obtaining access to the user account for a predetermined period of time (e.g., a couple minutes). In this regard, secondary computing device 102 may be configured to, before or in connection with establishing the wireless connection with primary computing device 101, request and receive (320) the temporary token from server 103 (e.g., over one or more operably connected networks). On receiving the temporary token, secondary computing device 102 may be configured to pass the temporary token to primary computing device 101 over the encrypted connection. The temporary token may be associated with the user account or a universal credential token (e.g., an OAuth passcode) for the user account.

In one or more implementations, prior to passing the account (or temporary) token to primary computing device 101, secondary computing device 102 may be configured to request confirmation from its user. For example, software at secondary computing device may visually and/or audibly prompt the user to confirm that the user wishes to register his or her user account with primary computing device 101 (see, e.g., FIG. 5B). If the user confirms the registration then secondary computing device 102 may send the account token associated with the user's account to primary computing device 101 over the encrypted wireless connection.

Primary computing device is configured to, on receiving the account token, use the account token to obtain user account information from server 103. In some implementations, the account token only grants access to a limited scope of information for the user. In some implementations, the account token grants access to the account as if the user was authenticating to the user account directly with a full set of the required credentials. Primary computing device 101 is configured to use the token to query (322) server 103 for the account information. Server 103 then provides (324) the account information to primary computing device 101, and primary computing device automatically registers the user account with the device so that the user may authenticate to primary computing device 101.

In the depicted example, primary computing device 101 is already associated with an existing user account 326 ("User 1"). During the foregoing registration process, a new user account 328 ("User 2") is added to primary computing device 101 when the account token is received by primary computing device 101 and used to retrieve the account information from server 103 (see also, e.g., FIG. 5C). Additionally, it is understood that the features described with respect to FIGS. 1 and 2 are combinable with the foregoing features described with respect to FIG. 3. For example, after registration of new user account 328 to primary computing device 101, secondary computing device 102 (also being registered to new user account 326) may be used to unlock or lock primary computing device 101 based on proximity of secondary computing device 102. During the foregoing registration of secondary computing device 102, primary computing device 101 may provide secondary computing device 102 a permanent key for use in unlocking or locking primary computing device (126). A user associated with new user account 326 may also sign in to primary computing device 101 and set up additional account-linked devices for unlocking and locking the device.

Figure 4:
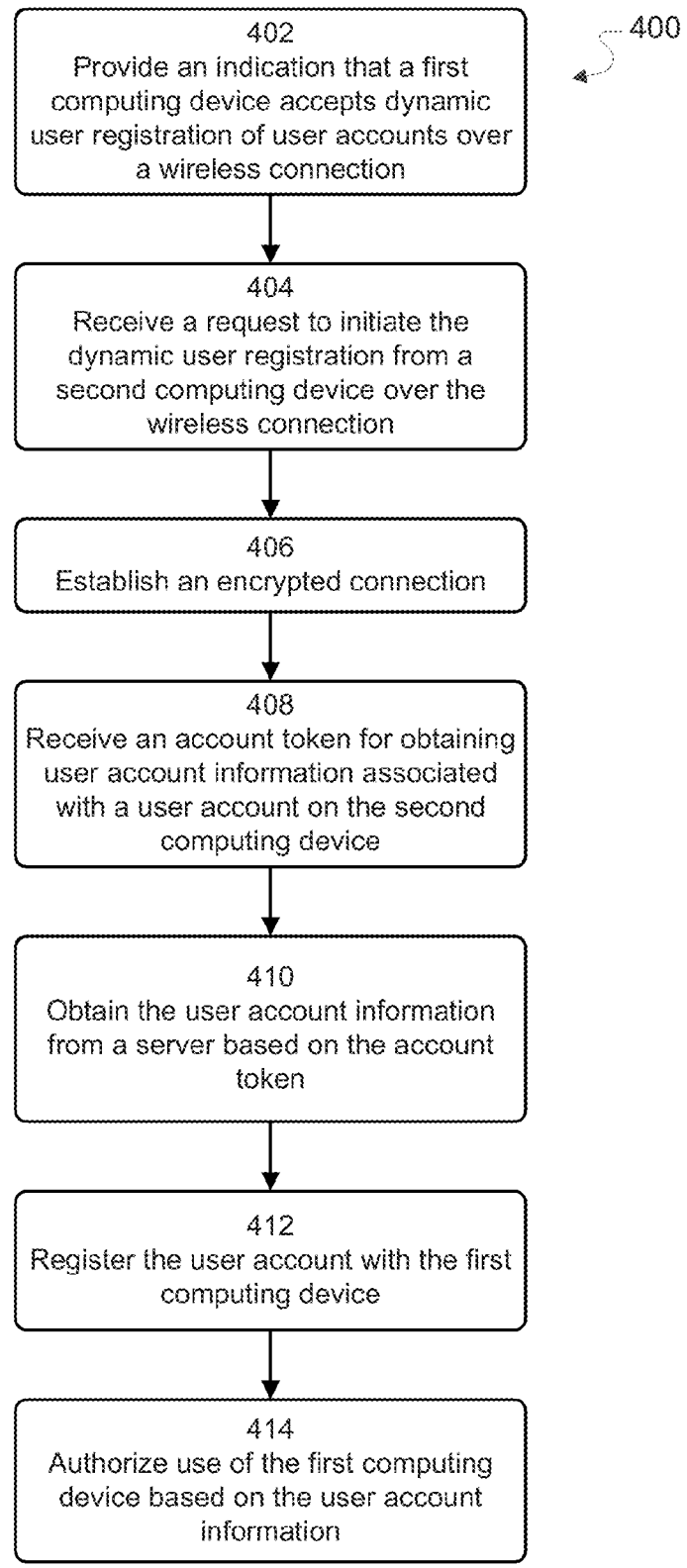
FIG. 4 illustrates a flow diagram of an example process for dynamic registration of a new user account on a computing device.

FIG. 4 illustrates a flow diagram of an example process 400 for dynamic registration of a new user account on a computing device. For explanatory purposes, example process 400 is described herein with reference to the data flow depicted FIG. 3, however, example process 400 may also be applicable to portions of FIGS. 1 and 2 and 6-7 or other component data flows and process described herein. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, primary computing device 101 and secondary computing device 102 may be operably connected to server 103 over one or more networks. Primary computing device 101 provides (e.g., advertises) an indication that primary computing device 101 accepts dynamic user registration of user accounts over a wireless connection (402). The indication may be provided, for example, by way of transmitting a code that may be retrieved by devices scanning or connected to wireless access point 308. With brief reference to FIG. 3, secondary computing device 102 receives the indication and initiates the registration process.

After or in connection with providing the indication, a request to initiate the dynamic user registration is received from a second computing device over the wireless connection (404). The request to initiate the dynamic user registration may include, for example, to a predetermined code known to primary computing device 101 for initiating the dynamic registration. In response to receiving the request (or predetermined code), an encrypted connection is established between primary computing device 101 and the secondary computing device 102 (406). After the encrypted connection is established, primary computing device 101 receives, over the encrypted connection, an account token for obtaining user account information corresponding to a user account associated with secondary computing device 102 (408). As described previously, the account token may be a universal credential token for use in authenticating to the user account, or a temporary access key for obtaining the universal credential token or for retrieving user account information required to register the user account with primary computing device 101.

On receiving the account token, primary computing device 101 obtains the user account information based on the account token from server 103 (410), for example, over the same or different network connection. As described previously, primary computing device 101 may be connected to server 103 via a network 302, and secondary computing device 102 may be connected to server 103 via a mobile network 304 or combination of networks. Accordingly, primary computing device 101 registers the user account with the first computing device in response to obtaining the user account information (812). The request, establishing the encrypted connection, receiving the account token, obtaining the user account information, and registering the user account information all may be performed without any physical interaction with the first computing device. Once registered, use of primary computing device may be authorized based on the user account information (814).

Figure 5A:
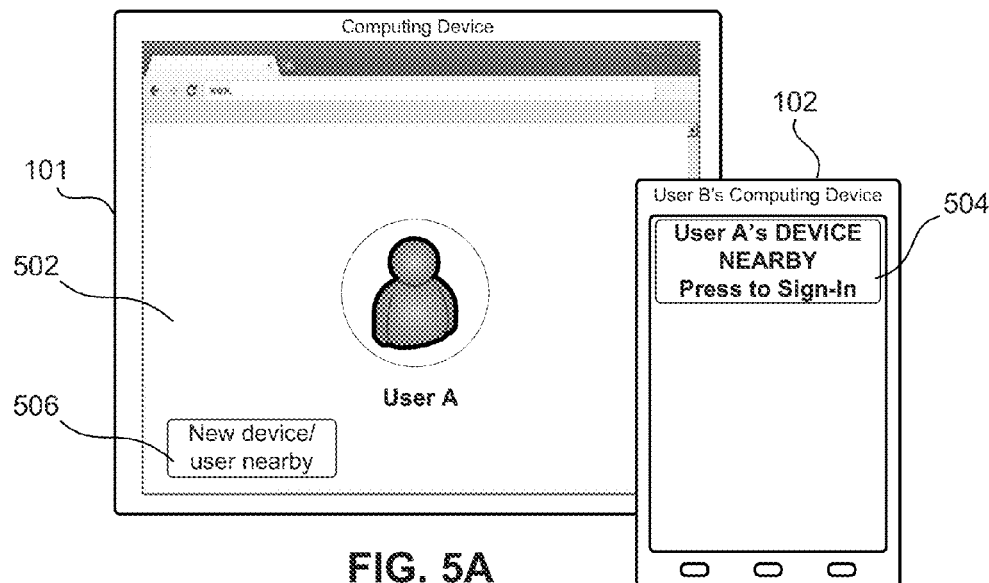
FIGS. 5A to 5C illustrate an example interaction between a primary computing device and a secondary computing device during an example dynamic registration of a new user account on the primary computing device.
Figure 5B:
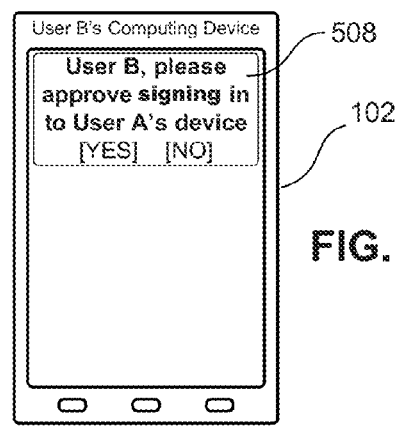
Figure 5C:
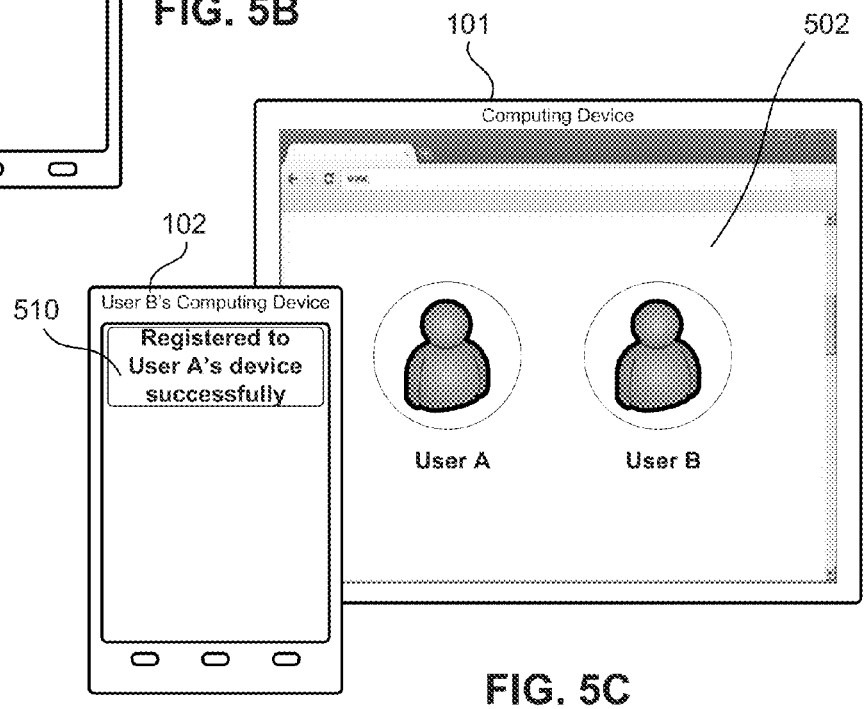

FIGS. 5A to 5C illustrate an example interaction between primary computing device 101 and secondary computing device 102 during an example dynamic registration of a new user account on primary computing device 101. With regard to FIG. 5A a security access screen 502 is displayed on primary computing device 102. Security access screen 502 initially indicates that User A is authorized to sign in to primary computing device 102. When secondary computing device 102 enters an area proximate primary computing device 101, secondary computing device 102 displays a first alert 504 which indicates to a user that primary computing device 101 is nearby.

Alert 504 may be displayed, for example, in response to secondary computing device 102 receiving an indication that primary computing device 101 accepts dynamic user registration. In some aspects, as depicted by FIG. 5A, alert 504 may visually (or audibly) indicate which user primary computing device 101 belongs, and/or prompt the user of secondary computing device 102 whether he or she wishes to sign-in to primary computing device 101 (e.g., "User A's device is nearby. Press to sign-in"). Primary computing device 101 may also display a device alert 506 indicating that a device capable of signing in to or registering with primary computing device 101 has been detected.

On selecting to sign-in, secondary computing device 102 may send a request to primary computing device 101 to initiate the dynamic user registration over a wireless connection. At that point, the request is received and an encrypted connection between the devices established. Secondary computing device 102 may then be ready to send an account token to primary computing device. Prior to sending the token, as depicted by FIG. 5B, secondary computing device 102 may display a second alert 508 which requests the user confirm the registration process. As described previously, on receiving confirmation that the user wishes to complete the registration process, secondary computing device 102 sends the account token to primary computing device 101, and primary computing device 101 automatically contacts server 103 to obtain account information associated with the account token and registers the user's account with primary computing device 101.

Once the user account has been registered with primary computing device 101, as depicted by FIG. 5C, security access screen 502 indicates that User A and User B are authorized to sign in to primary computing device 102. Secondary computing device 102 may then display a third alert 510 which indicates to the user that the registration was successful. Security access screen 502 may then be automatically removed and User B automatically authorized to user primary computing device 102. Any part the foregoing registration process may be implemented without display of access security screen 502. For example, if User A is currently signed-in to primary computing device 102 then the account information may be registered with the device in the background and control maintained by User A. Additionally or in the alternative, the foregoing various alerts or sequence of alerts described by FIGS. 5A to 5C may also be applicable to other processes described herein, for example, with respect to alerting a user of that primary computing device 101 is available nearby for unlocking.

Figure 6:
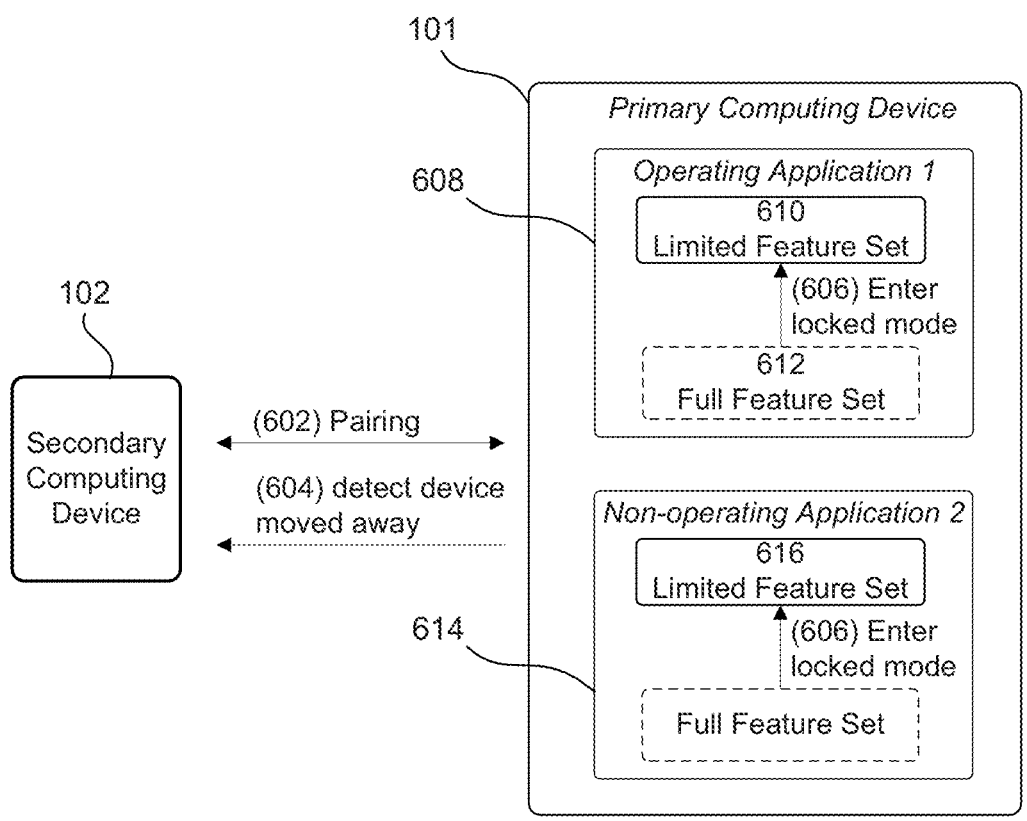
FIG. 6 illustrates example data flows through a system for limiting user interaction with a primary computing device based on proximity of a secondary computing device.

FIG. 6 illustrates example data flows through a system 600 for limiting user interaction with primary computing device 101 based on proximity of secondary computing device 102. In various implementations, primary computing device 101 may be configured to, on determining that secondary computing device 102 has moved a predetermined distance away from primary computing device 101, automatically limit user interaction with one or more applications operating on primary computing device 101 while preventing use of other applications. In some aspects, interaction with an application currently operating on the computing device is limited to a predetermined set of commands, while other applications provided by primary computing device 101 are completely restricted.

In one or more implementations, the predetermined distance by which primary computing device 101 determines that secondary computing device 102 has moved away or is nearby may be based on for example, whether the devices are currently paired, signal strength of the secondary computing device 102, data throughput over the wireless connection, and the like. Primary computing device 101 may flag a currently operating application based on sensing activity generated by the application or by a level of user interaction with the application, and only allow user interactions with a certain set of features of the flagged application. For example, primary computing device 101 and secondary computing device 102 may be paired and communicating over, for example, a personal area network or other wireless network (602). Secondary computing device 102 may then move away from primary computing device 101 (604). When primary computing device 102 detects that secondary computing device has moved sufficiently far away (e.g., by virtue of no longer being paired or the signal strength of the connection diminishing to a predetermined level) primary computing device 102 automatically enters into a locked mode (606).

According to the depicted example, when in the locked mode, use of primary computing device 101 by users may be limited based on predetermined locked feature sets of the respective applications installed on primary computing device 101. For example, each application may have a full feature set and a limited feature set. On entering the locked mode, primary computing device 101 may be configured to determine one or more currently operating applications 608 and allow use of a limited feature set 610 for one or more of those applications. Accordingly, a currently operating application's full feature set 612 may no longer available while in the locked mode, and the limited feature set 610 of an application may be a subset of the features available to full feature set 612 for the application. The extent of functionality available in limited feature set 610 may be determined based on, for example, the sensitivity of the application or the data used in connection with the application, or the level of account permissions associated with the currently signed-in user account.

Additionally or in the alternative, primary computing device 101 may be configured to determine one or more non-operating applications 614 on the first computing device that are associated with multiple feature sets for use in the locked mode, and limit user interaction with each of the one or more non-operating applications according to their associated respective feature set. For example, a limited feature set 616 may be available even if the applications was initially not operating or idle when primary computing device 101 entered the locked mode.

In one or more example implementations, one application operating on primary computing device 101 may be, for example, a web browser displaying a webpage of a streaming video service in a tab of the web browser. When secondary computing device 102 moves away from primary computing device 101, primary computing device 101 may enter into a locked mode in which only the tab of the web browser accepts user interaction (e.g., the tab becomes "pinned"). In that regard, any users remaining proximate to primary computing device 101 may not interact with other tabs of the web browser or other applications on the device. In this regard, sensitive user data may be protected. For example, primary computing device 101, on entering the locked mode may restrict access to history data, preferences, known user email components or URLs, and other sensitive information. In some aspects, the locked mode may also prevent further navigation from a currently displayed web page.

In some implementations, each application operating on the computing device may be associated with a level of sensitivity, and primary computing device 101 may determine (when in the locked mode) whether to allow user interaction with an application or operation based on the level of sensitivity assigned to the application or operation. For example, low level sensitivity operations may include interacting with a currently displayed web page or a currently operating application. Mid-level sensitivity operations may include browser navigation or opening other tabs in a browser, or opening applications that do not access certain operating system features such as the file system. High-level sensitivity operations may include viewing user information or navigation history or executing or interacting with applications that have access to operating system features or the file system. Applications and application features may be indexed in the lookup table by sensitivity level, and sensitivity levels available during the locked mode predetermined by administrative action prior to the device entering into the locked mode. In one implementation, the locked mode may allow user interaction with all applications having low-level sensitivity operations, but also allow user interaction with applications having mid-level sensitivity under certain conditions (e.g., when the computing device is located at a known safe location).

In some implementations, applications may be pre-registered for use with the subject technology such that each application has a predetermined feature set usable when in the locked mode. Pre-registration may be by way of, for example, integration with an API (application programming interface) configured to allow applications the ability to dynamically register at runtime which features are to be available or restricted when the device is in the locked mode.

In one example implementation, a registered application may be an audio or multimedia player. Accordingly, based on a pre-registered feature set for use in the locked mode, user interaction with the player may be limited to interactions required for playback of media provided by the player. For example, user interaction may be limited to only forward, reverse, stop, play, and volume functions. However, selecting a new audio or video stream for playback may be restricted. If the application is a virtual game then user interaction may be limited to interactions required for playing the virtual game, and in some implementations users may be prevented from initiating a new game when a current game is completed.

Figure 7:
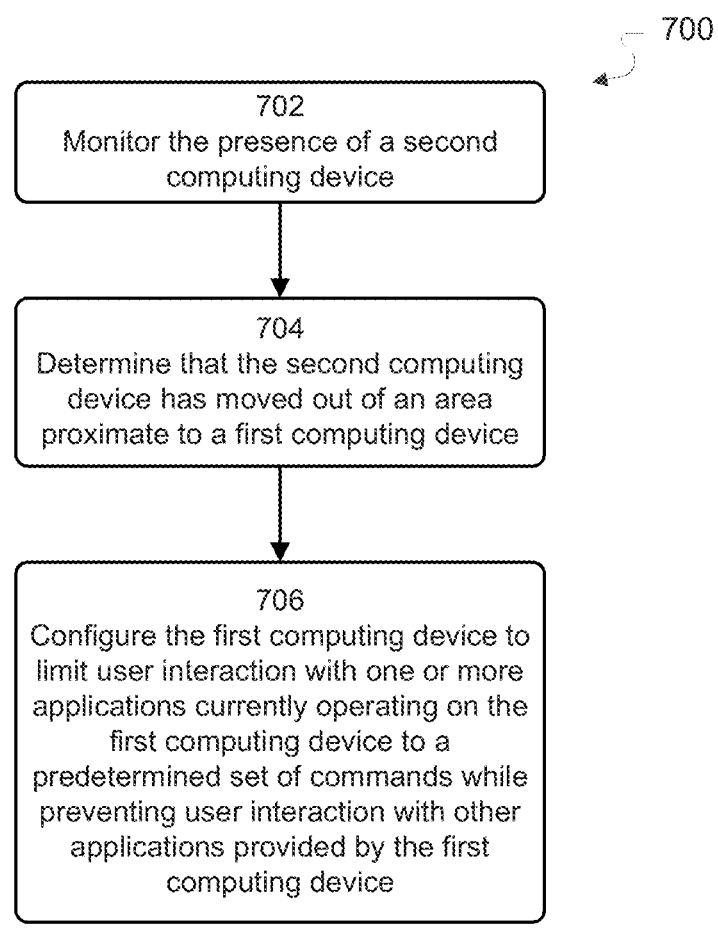
FIG. 7 illustrates a flow diagram of an example process for limiting user interaction with a primary computing device based on proximity of a secondary computing device.

FIG. 7 illustrates a flow diagram of an example process 700 for limiting user interaction with primary computing device 101 based on proximity of secondary computing device 102. For explanatory purposes, example process 700 is described herein with reference to the data flow depicted FIG. 6; however, example process 700 may also be applicable to portions of FIGS. 1 to 5 or other component data flows and process described herein. Further for explanatory purposes, the blocks of example process 700 are described herein as occurring in serial, or linearly. However, multiple blocks of example process 700 may occur in parallel. In addition, the blocks of example process 700 need not be performed in the order shown and/or one or more of the blocks of example process 700 need not be performed.

In the depicted example flow diagram, primary computing device 101 and secondary computing device 102 are operably connected to each other over a network. For example, the devices may be in communication using Bluetooth, Infrared, or other technology. In some aspects, the devices are configured to communicate with each other over a wireless personal area network. Accordingly, primary computing device 101 monitors the presence of secondary computing device (702). For example, primary computing device 101 may detect the wireless signature of primary computing device 101 in a paired device list associated with the wireless hardware of primary computing device 101, and then monitor the paired device list for the wireless signature of secondary computing device 102.

At some point, primary computing device 101 determines that secondary computing device 102 has moved out of an area proximate to primary computing device 101 (704). For example, primary computing device 101 may communicate with secondary computing device over the wireless personal area network, and then determine that secondary computing device is no longer in the wireless personal area network (e.g., no longer in the paired device list) and thus no longer available for communication. Additionally or in the alternative, primary computing device 101 may monitor a signal strength associated with secondary computing device 102, and then determine that the signal strength no longer satisfies a predetermined level (e.g., has declined below a certain dB-microvolts per meter or its data throughput has declined below a certain kBits/second).

In response to the determining, primary computing device 101 enters into a locked mode in which primary computing device 101 is configured to limit user interaction with one or more applications currently operating on the first computing device to a predetermined set of commands while preventing user interaction with other applications provided by the first computing device (706). In some aspects, the one or more applications to which user interaction will be limited is determined based on an amount of user interaction with the one or more applications satisfying a predetermined threshold level of interaction. For example, if a user is interacting with a video by pressing pause then play or rewind then primary computing device may determine that the number of interactions over a predetermined period of time with the application satisfies the threshold level of interaction and the application responsible for playing the video will be allowed to continue operating but limited in function. In some aspects, the one or more applications to which user interaction will be limited is determined based on an amount of activity generated by the one or more applications satisfying a predetermined threshold level of activity. For example, an API or other service operating on primary computing device 101 may monitor data throughput for each operating application and select which applications will be allowed to continue operating based on the data throughput satisfying a predetermined amount of data per unit of time. Accordingly, an audio or multimedia player that is currently streaming audio and/or video may be allowed to continue operating but limited in function.

In some implementations, multiple feature sets may be maintained for each application installed on primary computing device. For example, each application may include a first locked feature set and/or a second locked feature set. In response to determining that secondary computing device 102 moved out of the area, primary computing device may determine which of the applications in the group of applications are operating, determine a respective first locked feature set for each of the operating applications, and then for each operating application limit user interaction with the operating application according to the respective first locked feature set for the operating application. Additionally or in the alternative, primary computing device may determine which of the applications in the group of applications are not currently operating, determine a respective second locked feature set for each of the non-operating applications, and then for each non-operating application limit user interaction with the non-operating application according to the respective second locked feature set of the non-operating application.

Many of the above-described example processes 200, 400 and 700, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 8:
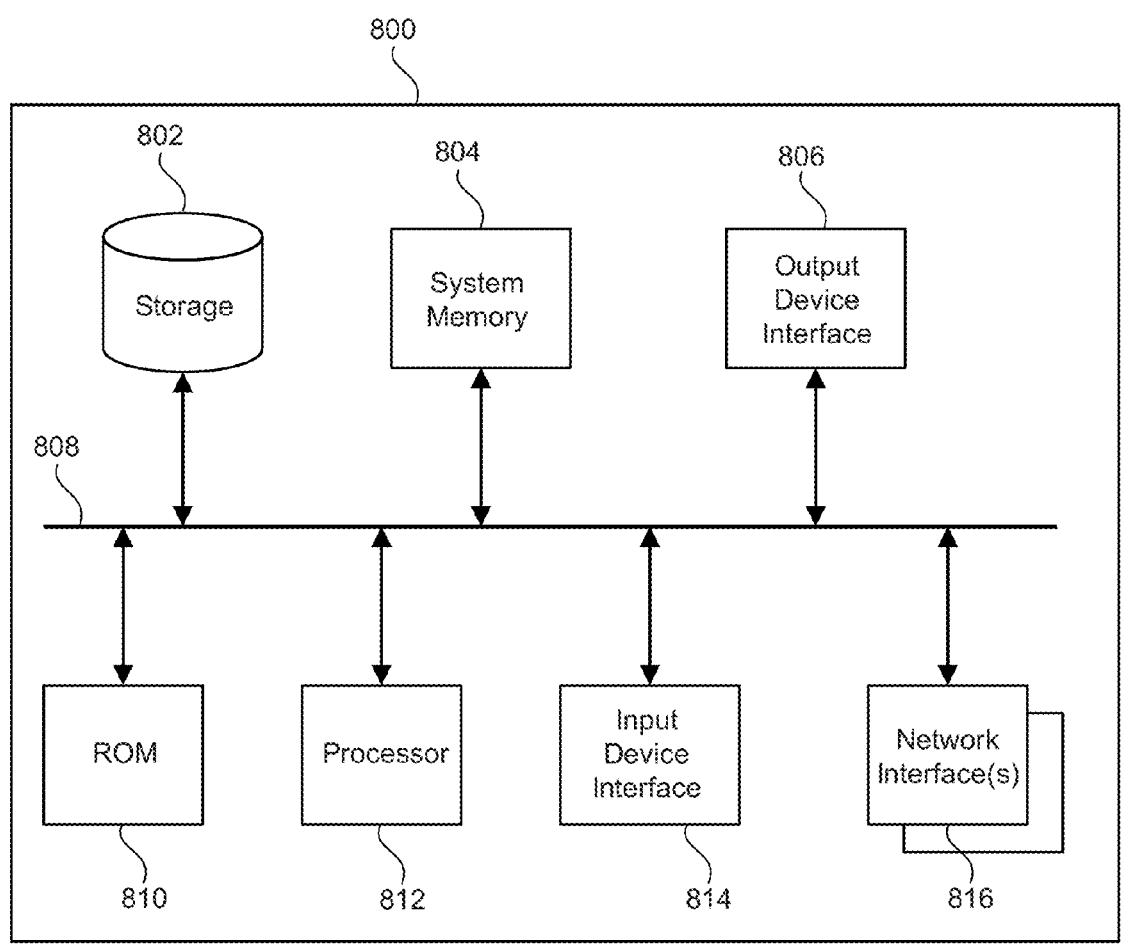
FIG. 8 is a diagram illustrating an example electronic system 800 for use in connection with adaptive rendering of displayable elements in a web page, according to one or more aspects of the subject technology.

FIG. 8 is a diagram illustrating an example electronic system 800 for use in connection with adaptive rendering of displayable elements in a web page, according to one or more aspects of the subject technology. Electronic system 800 may be a computing device for execution of software associated with the operation of systems 100, 300, or 600, or one or more portions or steps of process 200, 800 or 700, or components and processes provided by FIG. 1-7. In various implementations, electronic system 800 may be representative of primary computing device 101, secondary computing device 102, server 103, or a different server, computer, phone, PDA, laptop, tablet computer, touch screen or television with one or more processors embedded therein or coupled thereto, or any other sort of electronic device.

Electronic system 800 may include various types of computer readable media and interfaces for various other types of computer readable media. In the depicted example, electronic system 800 includes a bus 808, processing unit(s) 812, a system memory 804, a read-only memory (ROM) 410, a permanent storage device 802, an input device interface 814, an output device interface 806, and one or more network interfaces 816. In some implementations, electronic system 800 may include or be integrated with other computing devices or circuitry for operation of the various components and processes previously described.

Bus 808 collectively represents all system, peripheral, and chipset buses that communicatively connect the numerous internal devices of electronic system 800. For instance, bus 808 communicatively connects processing unit(s) 812 with ROM 410, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 410 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 410. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the electronic system. Input devices used with input device interface 814 include, for example, alphanumeric keyboards and pointing devices (also called "cursor control devices"). Output device interfaces 806 enables, for example, the display of images generated by the electronic system 800. Output devices used with output device interface 806 include, for example, printers and display devices, such as cathode ray tubes (CRT) or liquid crystal displays (LCD). Some implementations include devices such as a touchscreen that functions as both input and output devices.

Finally, as shown in FIG. 5, bus 808 also couples electronic system 800 to a network (not shown) through network interfaces 816. Network interfaces 816 may include, for example, a wireless access point (e.g., Bluetooth or WiFi). Network interfaces 816 may also include hardware (e.g., Ethernet hardware) for connecting the computer to a part of a network of computers such as a local area network ("LAN"), a wide area network ("WAN"), or an Intranet, or a network of networks, such as the Internet. Any or all components of electronic system 800 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   broadcasting, by a first computing device, a predetermined wireless connection signal over a wireless connection;
   receiving, from a second computing device in connection with the broadcasting and over the wireless connection, an initiation of an account registration on the first computing device, including an account token for obtaining user account information associated with a user account on the second computing device;
   obtaining, in response to receiving the account token, the user account information from a server at a different network location than the first computing device and the second computing device; and
   registering the user account with the first computing device based on the obtained user account information in response to obtaining the user account information.

2. The computer-implemented method of claim 1, further comprising:
   before receiving the initiation of the account registration, automatically pairing the second computing device to the first computing device over the wireless connection.

3. The computer-implemented method of claim 2, wherein the wireless connection is a personal area network, and wherein the first computing device and second computing device communicate with each other over the personal area network using Bluetooth.

4. The computer-implemented method of claim 1, wherein the account token is a universal credential token corresponding to the user account information.

5. The computer-implemented method of claim 1, wherein receiving the initiation of the account registration, receiving the account token, obtaining the user account information, and registering the user account are performed without any physical interaction with the first computing device.

6. The computer-implemented method of claim 1, further comprising:
   authorizing use of the first computing device in accordance with the user account information based on the second computing device being within a predetermined distance of the first computing device.

7. The computer-implemented method of claim 1, further comprising:
   after registering the user account, providing the second computing device an access key;
   placing the first computing device into a locked mode wherein access to the first computing device is restricted;
   receiving the access key from the second computing device; and
   removing the first computing device from the locked mode based on the access key from the second computing device.

8. The computer-implemented method of claim 7, further comprising:
   before removing the first computing device from the locked mode, validating the access key received from the second computing device based on a previously stored key associated with the second computing device at the first computing device.

9. The computer-implemented method of claim 7, further comprising:
   receiving a response code from the second computing device;
   automatically removing the first computing device from the locked mode if the response code indicates the second computing device is in an unlocked mode; and
   displaying a security access screen that includes an input for entering a passcode, and waiting for entry of the passcode before unlocking the first computing device, if the response code does not indicate the second computing device is in the unlocked mode.

10. The computer-implemented method of claim 1, further comprising:
    after registering the user account, identifying one or more account-linked devices associated with the account information;
    receiving one or more selections corresponding to one or more of the account-linked devices; and
    in response to receiving the one or more selections, automatically providing pairing information and respective access keys to respective selected devices, the pairing information configured to enable a respective device to automatically pair with the first computing device, a respective access key configured to, when received by the first computing device, cause the first computing device to remove the first computing device from a locked mode.

11. The computer-implemented method of claim 1, wherein the initiation of an account registration comprises a predetermined code known to the first computing device.

12. A computer program product tangibly embodied in a computer-readable storage device and comprising instructions that, when executed by a first computing device, cause the first computing device to:

broadcast a predetermined wireless connection signal over a wireless connection;

receive, from a second computing device in connection with the broadcasted predetermined wireless connection signal and over the wireless connection, an initiation of an account registration on the first computing device, including an account token for obtaining user account information associated with a user account on the second computing device;

obtain, in response to receiving the account token, the user account information from a server at a different network location than the first computing device and the second computing device; and register the user account with the first computing device based on the obtained user account information in response to obtaining the user account information.

13. The computer program product of claim 12, wherein the wireless connection is a personal area network, and wherein the first computing device and the second computing device communicate with each other over the personal area network using Bluetooth.

14. The computer program product of claim 12, wherein the initiation of an account registration, receiving the account token, obtaining the user account information, and registering the user account are performed without any physical interaction between the first computing device and the second computing device.

15. The computer program product of claim 12, wherein the instructions, when executed by the first computing device, further cause the first computing device to:

after registering the user account, providing the second computing device an access key;

enter into a locked mode wherein access to the first computing device is restricted;

receive the access key from the second computing device while in the locked mode; and exit the locked mode based on the access key from the second computing device.

16. The computer program product of claim 15, wherein the instructions, when executed by the first computing device, further causing the first computing device to:

before exiting the locked mode, validate the access key received from the second computing device based on a previously stored key associated with the second computing device at the first computing device.

17. The computer program product of claim 15, wherein the instructions, when executed by the first computing device, further causing the first computing device to:

receive a response code from the second computing device;

automatically exit the locked mode if the response code indicates the second computing device is in an unlocked mode; and display a security access screen that includes an input for entering a passcode, and waiting for entry of the passcode before exiting the locked mode, if the response code does not indicate the second computing device is in the unlocked mode.

18. The computer program product of claim 12, wherein the instructions, when executed by the first computing device, further causing the first computing device to:

after registering the user account, identify one or more account-linked devices associated with the user account;

receive one or more selections corresponding to one or more of the account-linked devices;

in response to receiving the one or more selections, automatically provide pairing information and respective access keys to respective selected devices, the pairing information configured to enable a respective device to automatically pair with the first computing device; and on receiving the pairing information and one of the provided respective access keys from a respective device, automatically pair with the respective device and exit a locked mode.

19. The computer program product of claim 12, wherein receiving the initiation of the account registration comprises receiving from the second computing device a predetermined code known to the first computing device.

20. A system, comprising:

one or more processors; and a memory including instructions that, when executed by the one or more processors, cause the one or more processors to facilitate the steps of:

broadcasting a predetermined wireless connection signal for a first computing device over a wireless connection;

receiving, from a second computing device in connection with the broadcasted predetermined wireless connection signal and over the wireless connection, an initiation of an account registration on the first computing device, including an account token for obtaining user account information associated with a user account on the second computing device;

obtaining, in response to receiving the account token, the user account information from a server at a different network location than the first computing device and the second computing device; and registering the user account with the first computing device based on the obtained user account information in response to obtaining the user account information.

\* \* \* \* \*